Figure 1:
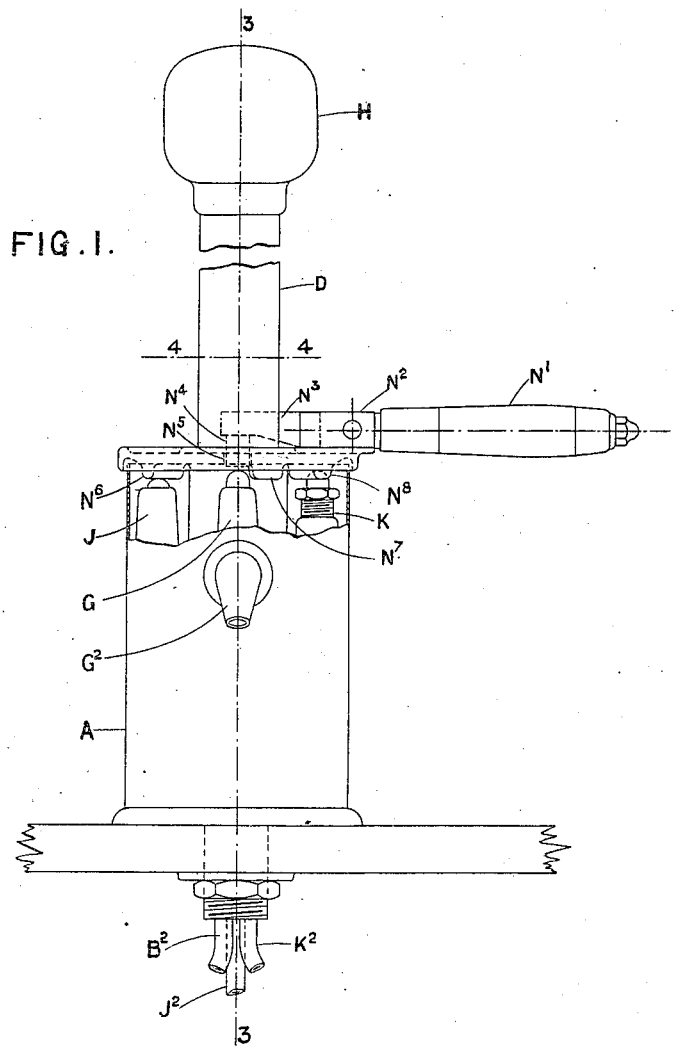

H. PEARCE & W. BARRATT.
APPARATUS FOR AERATING LIQUIDS.
APPLICATION FILED JUNE 17, 1910.

1,050,999.

Patented Jan. 21, 1913.
3 SHEETS—SHEET 1.

Witnesses:
M. Hefling
C. Langer

Inventors:
Hubert Pearce,
William Barratt,
by B. Singer,
Atty.

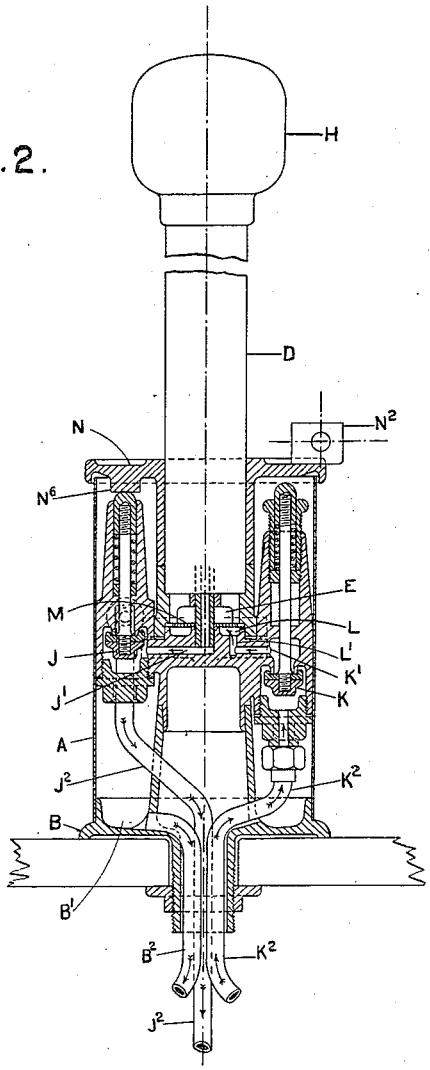

H. PEARCE & W. BARRATT.
APPARATUS FOR AERATING LIQUIDS.
APPLICATION FILED JUNE 17, 1910.
1,050,999.
Patented Jan. 21, 1913.
3 SHEETS—SHEET 3.
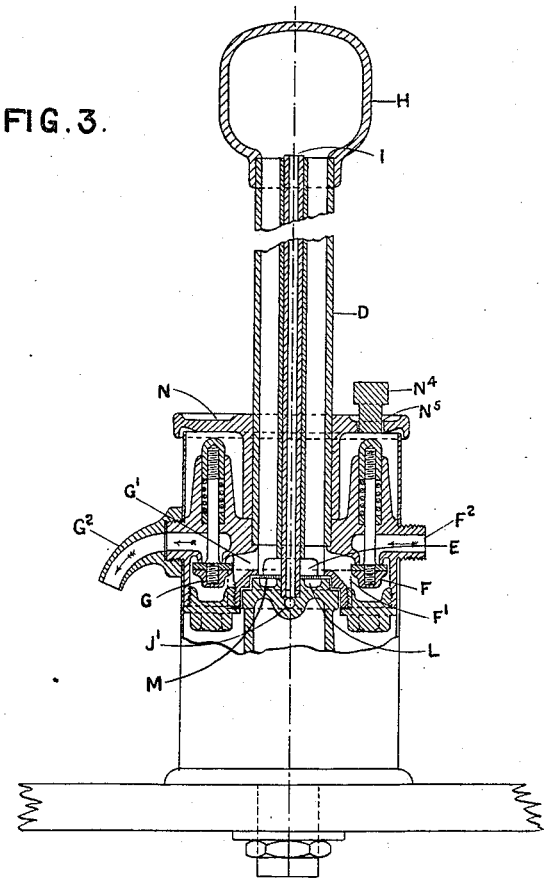
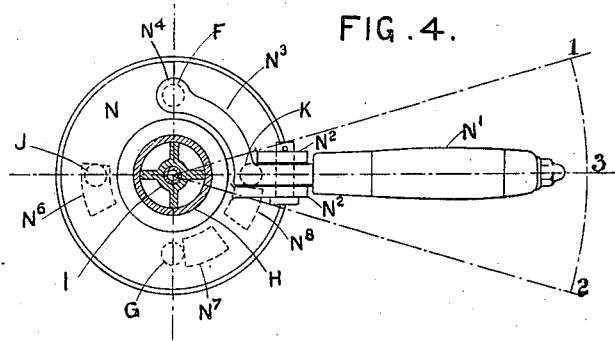
Witnesses,
M. Hefling.
E. Singer.
Inventors:
Hubert Pearce,
William Barratt,
by B. Singer,
Atty.

UNITED STATES PATENT OFFICE.

HUBERT PEARCE, OF WANSTEAD, AND WILLIAM BARRATT, OF MUSWELL HILL, ENGLAND, ASSIGNORS TO CONSOL AUTOMATIC AERATORS LIMITED, OF LONDON, ENGLAND.

APPARATUS FOR AERATING LIQUIDS.

1,050,999.

Specification of Letters Patent. Patented Jan. 21, 1913.

Application filed June 17, 1910. Serial No. 567,417.

*To all whom it may concern:*

Be it known that we, HUBERT PEARCE, a subject of the King of Great Britain, residing at 3 Oakhall road, Wanstead, in the county of Essex, England, engineer, and WILLIAM BARRATT, a subject of the King of Great Britain, residing at 6 Thirlmere road, Muswell Hill, in the county of Middlesex, England, engineer, have invented certain new and useful Improvements in Apparatus for Aerating Liquids, of which the following is a specification.

This invention relates to the manufacture of aerated liquids and has for its object to carry out the process in such a way that the complete aeration of the liquid can be effected in one vessel instead of in two or in three vessels, thereby simplifying the apparatus used. The aerated liquid may be discharged direct into a glass or bottle, or by affixing any known and suitable form of filling head to the apparatus, and modifying the process accordingly, bottles or siphons may be filled under pressure.

Apparatus for carrying out our invention is illustrated in the accompanying drawings wherein—

Figure 1 is a front elevation; Fig. 2 is a vertical section of the lower part thereof; Fig. 3 is a partly sectional elevation taken on the line 3—3 in Fig. 1; and Fig. 4 is a plan section on the line 4—4 in Fig. 1.

The same letters of reference where they occur are used to indicate the same or corresponding parts in all the figures of the drawings.

In these drawings A is the casing of the apparatus, and B is the base having a drip tray B' therein with a drain pipe B² for carrying off waste liquid. Within the casing is mounted a cylindrical, or other suitably shaped, vessel D hereinafter referred to as the aerating chamber D. This aerating chamber D is in open communication with a space E communicating by the ports F' and G', with the liquid inlet and outlet valves F and G respectively. To the other end of the aerating chamber D is connected an enlarged head forming a gas pressure chamber H.

Passing through the aerating chamber D is a snifting tube I in open communication at one end with the gas chamber H and at the other end with the port J' leading to the snifting valve J, as shown in Fig. 2. The carbonic acid or other gas is admitted by the inlet pipe K² and passes through the valve K and ports K' and L' to the gas chamber L under the baffle plate M which latter is provided with exceedingly small perforations so as to cause the gas passing therethrough to be broken up into very fine streams.

The aerating chamber D may be made as a single tube or vessel with the snifting tube I passing down close to one side thereof, or it may be made annular with the snifting tube passing down the center, or preferably the aerating chamber is divided longitudinally into two or more compartments; and obviously the aerating chamber may be formed of a series of tubes each in open communication with the gas chamber H and with the space E. But in all cases the construction is such as to provide in the vessel, or in each of the tubes or compartments thereof, a column of liquid of considerable height relatively to its diameter, for instance, in substantially the proportions shown, and thus to insure that the aerating gas passing thereinto through the very small perforations in the baffle plate M shall become intimately associated with and diffused throughout, the whole column of liquid in its upward passage therethrough. In the construction shown in the drawings the aerating chamber D is formed of a single tube divided into four longitudinal compartments. The gas chamber H is in all cases approximately equal in capacity to that of the aerating chamber D.

As shown in the drawings, the four valves, the liquid inlet valve F, the liquid outlet or discharge valve G, the snifting valve J, and the gas inlet valve K, are all spring closing valves and are arranged to be opened in proper sequence by means of a plate N mounted to rotate on the outside of the aerating chamber D and on the top of the casing A. The handle N' is pivoted in lugs N² on the plate N its inner arm N³ being curved or bent and having a dependent lug N⁴ which passes through an aperture N⁵ in the plate N so as to rest upon the upper end of the liquid inlet valve F, (see Figs. 1 and 4). The other three valves are depressed by projections N⁶, N⁷ and N⁸ on the under side of the plate N. The inlet pipe F² is connected to a water main or other source of supply.

The mode of operation is as follows:—The plate N is brought to the central normal position marked with the numeral 3 in Fig. 4; this brings the projection N⁶ on the underside of the said plate N above the snifting valve J which is thereby opened. The handle N' is then raised thereby depressing the lug N⁴ and opening the liquid inlet valve F. The liquid then flows through the port F' to the space E and thence through the tube or tubes or compartments of the aerating chamber D to the gas chamber H, until it reaches the upper part of the snifting tube I down which it overflows and out through the snifting valve J and snifting outlet overflow pipe J². When this occurs the operator knows that the aerating chamber D is filled with liquid, he thereupon rotates the plate N carrying the handle N' from position 3 to position 1; this rotation first removes the projection N⁶ from above the snifting valve J allowing same to close by its spring, and directly this valve is completely shut off, the projection N⁸ comes above the gas inlet valve K and opens same. The gas is then admitted from pipe K² through valve K and ports K' and L' to space L thence through the minute perforations in the baffle plate M, and through the liquid in the aerating chamber D, the surplus accumulating in the gas chamber H. When the sound of gas passing through the column or columns of liquid ceases, the aeration of the liquid is completed and it is ready for drawing off into the glass or bottle. To do this, the plate N is rotated slowly until the handle N' is brought from the position 1 to the position 2. During this movement the projection N⁸ is removed from above the gas valve K which thereupon closes automatically under the action of its spring, the projection N⁶ immediately after engages with and opens the snifting valve J which permits the surplus gas in the gas chamber H to escape by way of the snifting pipe I to the atmosphere, the pressure being thus reduced to atmospheric pressure. Finally as the plate N reaches the position 2 the projection N⁷ thereon engages and opens the aerated water outlet valve G, permitting the aerated liquid to flow quietly from the aerating chamber D through the delivery nozzle G². It will be seen from the position of the projection N⁶ on the plate N as shown in Fig. 4, that the snifting valve J is kept open during the delivery of the aerated water, thus preventing any diminution of pressure and insuring the quiet discharge in the glass, so essential to a perfectly aerated water.

To prevent waste, the liquid, instead of being taken from a constant supply, may be taken from a stationary reservoir arranged to supply the water to the top of the aerating chamber D and the snifting tube I may be carried up to near the upper end of the gas chamber H.

It will be seen that by our invention the quantity of aerated liquid drawn off can be determined by the operator without detriment to the working of the apparatus.

For filling bottles or siphons under pressure, the modification shown in Fig. 5 is adopted. For this purpose we provide a filling head G³ which we screw on to the apparatus in place of the delivery nozzle G² used for draft. This filling head is provided with a snifting valve G⁴ and a handle G⁵ for operating same, so arranged on a pivot G⁶ that it can be used to control the liquid outlet valve G on the aerator, and the snifting valve G⁴ on the filling head, by a backward or forward movement. We also tap a hole in the plate N beside the projection N⁷ and immediately above the discharge valve G when the plate N is in the normal position 3 shown in Fig. 4. Into this hole we screw a bush N⁹ in which is mounted a spring block N¹⁰. With this modification the charge of liquid is admitted to the aerating chamber D and aerated by the same operations as previously described; the method of filling the bottle or siphon under pressure is as follows:—The plate N having been brought to the position 1 for the purpose of aerating the liquid contents of the aerating chamber is allowed to remain there for a short time so that the pressure of gas is maintained within the chamber H. A bottle or siphon is then secured in position against the filling head by the usual known mechanism for this purpose, and the pivoted handle G⁵ on the filling head is moved so as to open the aerated liquid outlet valve G; the liquid then passes into the bottle or siphon until the pressure of gas and air therein is too great, whereupon the handle G⁵ is moved in the opposite direction to open the snifting valve G⁴ in the filling head thus permitting the excess gas and air to escape by suitable conduits from the bottle or siphon. The handle G⁵ is then moved to again open the aerated liquid outlet valve G permitting more aerated liquid to pass into the bottle or siphon, the operation being repeated until the bottle or siphon is full.

Having fully described our invention, what we claim and desire to secure by Letters Patent is:—

1. Apparatus for aerating liquids, comprising an aerating chamber formed of or provided with a tube or tubes or longitudinal compartments each of considerable height relatively to its diameter, a gas chamber into which each tube or compartment opens, a snifting valve, a tube passing downward through the aerating chamber serving to drain off surplus liquid therefrom and opening communication between said gas chamber and said snifting valve, a baffle plate having minute perforations therein and situated beneath the aerating chamber, a gas valve admitting gas to the underside of said baffle plate, and liquid inlet and outlet valves, all arranged substantially as described and for the purposes stated.

2. Apparatus for aerating liquids, comprising an aerating chamber formed of or provided with a tube or tubes or longitudinal compartments each of considerable height relatively to its diameter, a gas chamber located above said aerating chamber into which said gas chamber each tube or compartment opens, a snifting valve, a tube opening communication between said gas chamber and said snifting valve, a baffle plate having minute perforations therein and situated beneath the aerating chamber, a gas valve admitting gas to the underside of said baffle plate, and liquid inlet and outlet valves, all arranged substantially as described and for the purposes stated.

3. Apparatus for aerating liquids, comprising an aerating chamber formed of or provided with a tube or tubes or longitudinal compartments each of considerable height relatively to its diameter, a gas chamber approximately equal in capacity to the aerating chamber and located above said aerating chamber into which said gas chamber each tube or compartment opens, a snifting valve, a tube opening communication between said gas chamber and said snifting valve, a baffle plate having minute perforations therein and situated beneath the aerating chamber, a gas valve admitting gas to the underside of said baffle plate, and liquid inlet and outlet valves, all arranged substantially as described and for the purposes stated.

4. Apparatus for aerating liquids, comprising an outer casing, an aerating chamber mounted in and extending above said outer casing and open at its upper end, a gas chamber connected to and communicating with the upper open end of the aerating chamber, a snifting valve in the casing, a tube opening communication between said gas chamber and said snifting valve, a baffle plate having minute perforations therein and situated in the casing beneath the aerating chamber, a port in the casing beneath said baffle plate, a gas valve admitting gas to said port, and liquid inlet and outlet valves, all arranged substantially as described and for the purposes stated.

In testimony whereof we have hereunto set our hands in presence of two subscribing witnesses this 4th day of June, 1910.

HUBERT PEARCE.
WILLIAM BARRATT.

Witnesses:
R. WILSON,
H. D. JAMESON.

---

Copies of this patent may be obtained for five cents each, by addressing the "Commissioner of Patents, Washington, D. C."